(12) United States Patent
Webb et al.

(10) Patent No.: US 11,354,071 B2
(45) Date of Patent: Jun. 7, 2022

(54) NAVIGATION PRINTING WITH VOICE TAGGING

(71) Applicant: Hewlett-Packard Development Company, L.P., Spring, TX (US)

(72) Inventors: Rowdy K Webb, Vancouver, WA (US); Elijah Houle, Vancouver, WA (US); Colton Prettyman, Vancouver, WA (US); Tao Fan, Vancouver, WA (US); Leah Davidson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/981,426

(22) PCT Filed: Apr. 30, 2018

(86) PCT No.: PCT/US2018/030105
§ 371 (c)(1),
(2) Date: Sep. 16, 2020

(87) PCT Pub. No.: WO2019/212459
PCT Pub. Date: Nov. 7, 2019

(65) Prior Publication Data
US 2021/0048980 A1 Feb. 18, 2021

(51) Int. Cl.
*G06F 3/12* (2006.01)
*G06F 3/16* (2006.01)
*G10L 17/24* (2013.01)

(52) U.S. Cl.
CPC .......... *G06F 3/1206* (2013.01); *G06F 3/1204* (2013.01); *G06F 3/167* (2013.01); *G10L 17/24* (2013.01); *G03G 2215/00122* (2013.01)

(58) Field of Classification Search
None
See application file for complete search history.

(56) References Cited

U.S. PATENT DOCUMENTS

| | | | |
|---|---|---|---|
| 5,692,225 A | 11/1997 | Bernardi | |
| 5,991,514 A | 11/1999 | Nielsen | |
| 6,377,928 B1 | 4/2002 | Saxena et al. | |
| 6,965,439 B1 | 11/2005 | Silverbrook et al. | |
| 7,424,129 B2 | 9/2008 | Hull et al. | |
| 8,023,935 B2 | 9/2011 | Silverbrook et al. | |
| 9,152,357 B2 | 10/2015 | Hwang | |
| 9,349,374 B2 | 5/2016 | Buser et al. | |
| 2003/0072013 A1 | 4/2003 | Norris | |
| 2005/0068581 A1 | 3/2005 | Hull | |
| 2008/0159491 A1 | 7/2008 | Kelley et al. | |
| 2011/0209041 A1 | 8/2011 | Haq | |
| 2014/0232816 A1* | 8/2014 | Wilson | G06F 3/011 348/14.08 |

FOREIGN PATENT DOCUMENTS

WO WO-2004015587 A1 2/2004

\* cited by examiner

*Primary Examiner* — Lennin R Rodriguezgonzalez
(74) *Attorney, Agent, or Firm* — Dicke Billig & Czaja PLLC

(57) ABSTRACT

A method includes receiving, via a microphone at a printer, a voice command based on a tag of an indexed document. The method further includes digitizing the voice command. The method further includes retrieving a supplemental document based on the digitized voice command. The method further includes printing the supplemental document at the printer.

20 Claims, 6 Drawing Sheets

NAVIGATION PRINTING WITH VOICE TAGGING

BACKGROUND

Printers and other multi-function printing devices are commonly used to print a variety of types of content for user consumption. Content may include, for example, news, games, stories, photographs, marketing brochures, instruction manuals, and so on. Initiating printing of content generally calls for user interaction via a user interface. For example, a user may select and initiate printing of content via a personal computer, a smartphone, or another computing device in communication with the printer by leveraging a user interface of the computing device to navigate to the content. Consumption of the printed content commonly leads to a desire to print additional related content. It may be time consuming and tedious, however, to navigate to and identify the additional related content via the user interface of the computing device. This may result in the user forgoing the opportunity to print the additional desired related content.

DETAILED DESCRIPTION

This disclosure relates to a system and method for navigation printing with a content hierarchy via voice tagging. In particular, navigation printing with via voice tags enables easy and flexible printing of related content with voice commands, thereby eliminating the need for time consuming and tedious navigation via a traditional user interface of a computing device.

Figure 1:
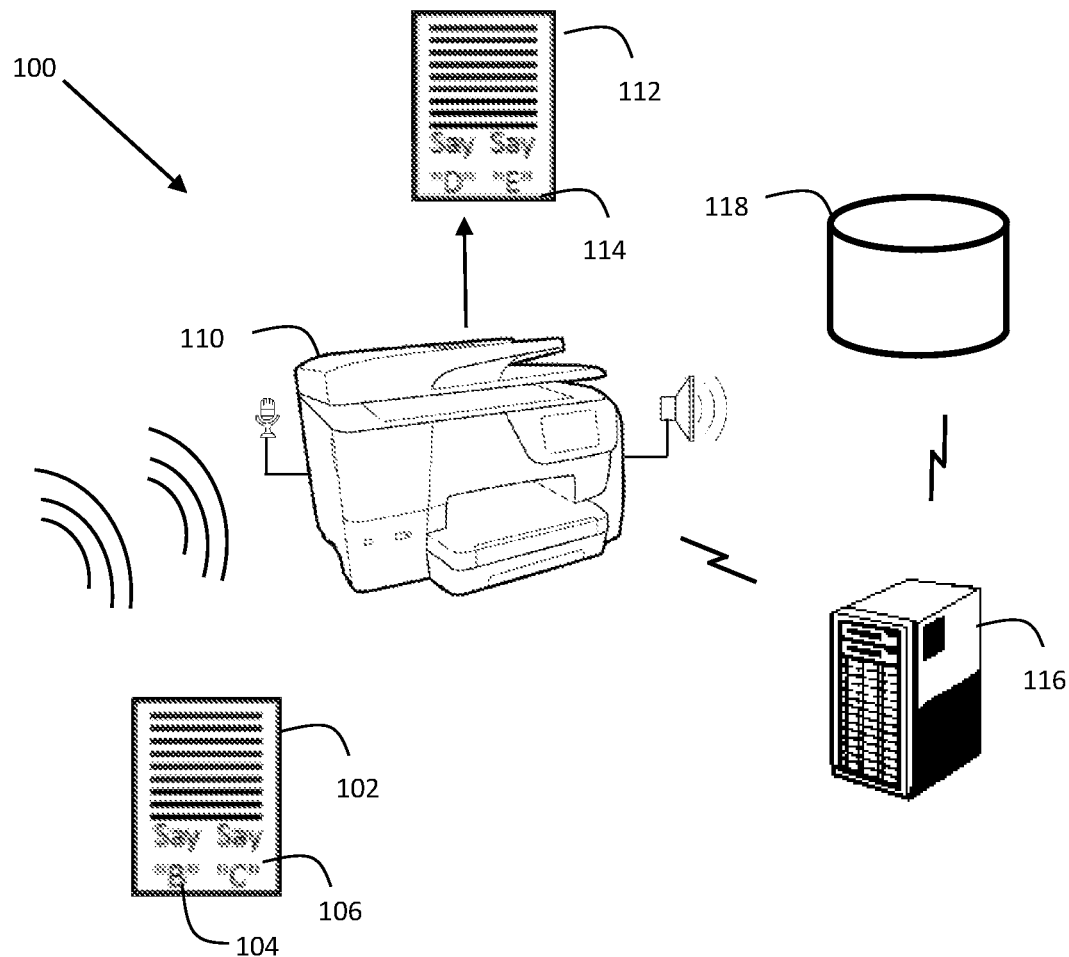
FIG. 1 illustrates and example system for navigation printing with a content hierarchy via voice tagging.

FIG. 1 illustrates an example system 100 for navigation printing with a content hierarchy via voice tagging (hereinafter referred to as "navigation printing system 100"). The navigation printing system 100 includes a tagged document 102 for enabling interaction with the navigation printing system 100. The tagged document 102 includes a first printed tag 104, illustrated as "Say B," and a second tag 106, illustrated as "Say C." Although the example tagged document 102 includes two printed tags, the tagged document 102 may include any number of printed tags. Additionally, although the first and second printed tags 104 and 106 are illustrated near the bottom of the tagged document 102, the first and second printed tags 104 and 106 may be positioned anywhere on the document. For example, the tagged document 102 may be subdivided into sections such as a first section and a second section (not shown), wherein the first printed tag 104 is positioned within or near the first section and the second printed tag 106 is positioned within or near the second section. Thus, printed tags may be associated with sections of the tagged document 102.

The tagged document 102 enables interaction with the navigation printing system 100 by providing voice commands for initiating printing of content related to the tagged document 102. In particular, the first and second printed tags 104 and 106 indicate voice commands which a user may speak out loud in order to print related content. For example, the first printed tag 104 may provide the voice command "Say B" for printing additional content related to a first section of the tagged document 102 and the second printed tag 106 may provide the voice command "Say C" for printing additional content related to a second section of the tagged document 102. Thus, as a user consumes the content of the tagged document 102, the user may opt to print additional content related to a section of interest by speaking a voice command, such as "B" or "C," as indicated by a tag associated with the section of interest. It should be appreciated that although first and second printed tags 104 and 106 are illustrated as the voice commands "Say B" and "Say C" respectively, the first and second printed tags 104 and 106 may include any suitable voice commands. For example, a printed tag may be illustrated as "Say More Information," "Say Print Remainder of Section 1," and so on.

The navigation printing system 100 further includes a printer 110 configured to receive spoken verbal commands and to digitize the received verbal commands. The printer is further configured to print a related document 112 based on processing of the digitized verbal commands. In one example, the printed related document 112 includes additional printed tags 114 to enable navigation to and printing of yet additional related content (not shown). In one example, instead of receiving spoken verbal commands and digitizing the commands, the navigation printing system 100 is configured to receive digitized voice commands from a voice processing device (not shown), such as Amazon Alexa or Google Assistant.

The printer 110 can include any printer or multi-function device having printing capabilities that also includes voice recognition and processing capabilities. In one example, the printer 110 is configured to continuously listen for and process audible voice commands. In one example, the printer 110 is configured to remain in a sleep mode and listens for and process verbal commands upon being awoken. The printer 110 may be configured to be awoken by a push-button, for example. In another example, the printer 110 may be configured to be awoken after detecting motion near the printer 110.

The navigation printing system 100 further includes a navigation printing computing device 116 configured to receive and process digitized voice commands from the printer 110. More particularly, the navigation printing computing device 116 is configured to identify and retrieve content from a content database 118 based on the digitized voice command. It should be appreciated that although the content database 118 is illustrated independently of the navigation printing computing device 116, the navigation printing computing device 116 may be configured to include the content database 118. In other examples, the content database 118 may include third party data stores or data providers, such as a library or a content publisher. Although a single content database 118 is illustrated, the navigation printing system 100 may include numerous databases, of various types, sizes, and locations, for providing content to the navigation printing computing device 116. The navigation printing computing device 116 is also configured to communicate the retrieved content to the printer 110 for printing.

In one example, the navigation printing computing device 116 may be further configured to identify and associate voice commands with content in order to enable printing of additional related content via spoken verbal commands. In particular, the navigation printing computing device 116 is configured to embed tags corresponding to the identified voice commands into the content.

In one example, the navigation printing computing device 116 may be further configured to index a document by splitting content of the document into sections and associating voice commands with the different sections. For example, a front page of a newspaper may include several news stories. Thus, the navigation printing computing device 116 may split each story into a separate section. Moreover, the navigation printing computing device 116 may associate the stories or sections with voice commands. By including tag corresponding to the voice commands into a printed front page of the newspaper, the navigation printing computing device 116 enables a user to initiate printing of additional content related to the respective stories or sections by speaking the voice commands identified by the associated tags.

In one example, the navigation printing computing device 116 may be further configured to define voice commands and associate the defined voice commands with content stored in the content database 118. For example, the navigation printing computing device 116 may associate a front cover of a daily newspaper with the voice command "Newspaper Cover." Thus, by associating the voice command "Newspaper Cover" with retrieved content, or a section of retrieved content, to be printed by the printer 110 and instructing the printer 110 to print a tag illustrative of the voice command along with the retrieved content, the navigation printing computing device 116 enables a user to print the front cover of the daily newspaper by verbally speaking the voice command "Newspaper Cover" during or after consuming the retrieved content.

The navigation printing computing device 116 may include any computing device such as a desktop computer, a laptop computer, and a computer server. Although illustrated independently, in one example, the navigation printing computing device 116 and the printer 110 may be combined into a single printing and computing device (not shown) configured to receive and digitize spoken verbal commands, to process the digitized voice commands, and to print the related document 112 based on the digitized verbal commands. In another example, the navigation printing computing device 116 may be configured to receive spoken verbal commands, to digitize the received verbal commands, and to process the digitized voice commands, while the printer 110 is configured to print the related document 112 based on the processed digitized voice commands.

Figure 2:
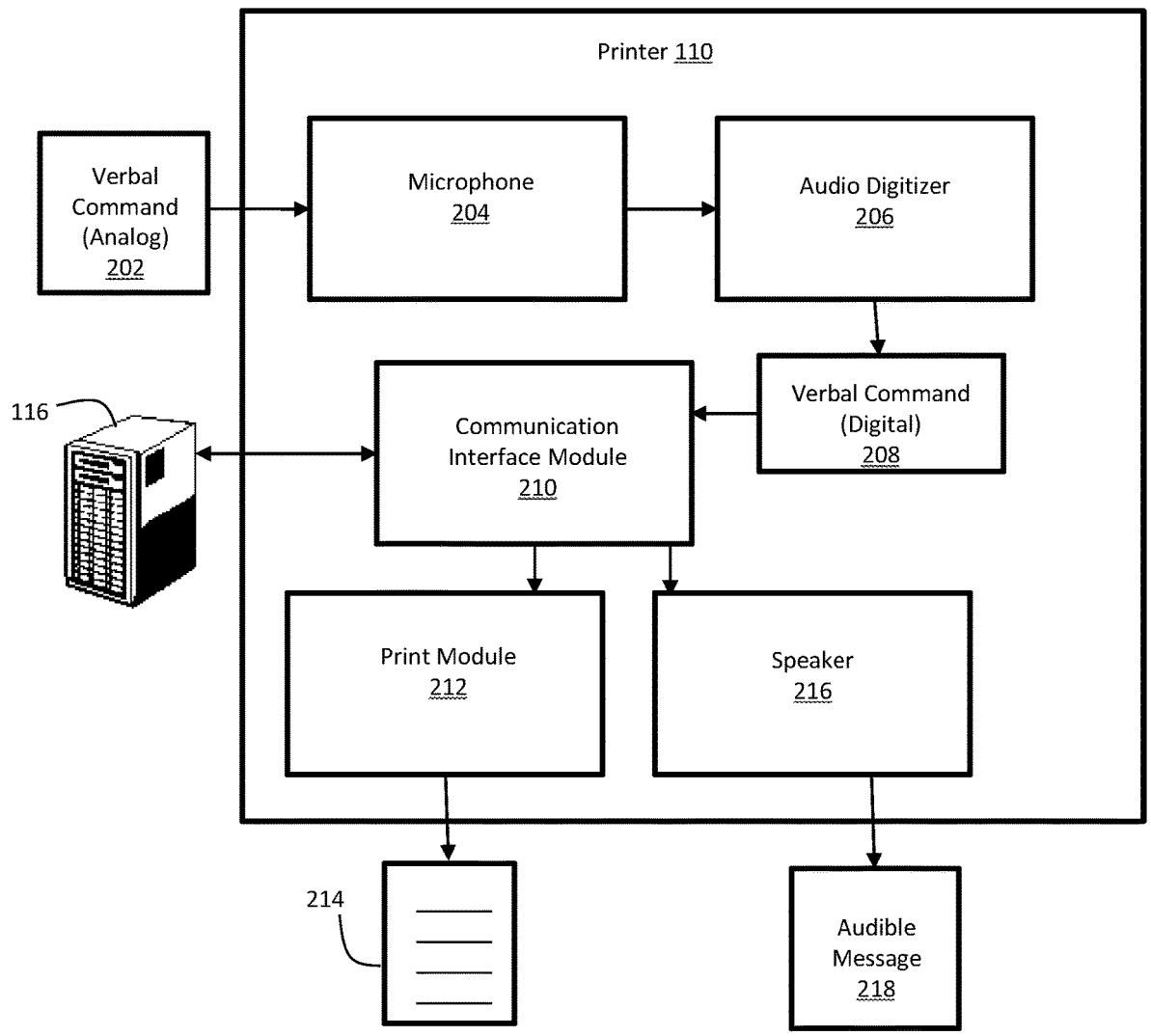
FIG. 2 illustrates a block diagram of an example printer of FIG. 1.

FIG. 2 illustrates a block diagram of the example printer 110 of FIG. 1. The printer 110 includes a microphone 204 for receiving a spoken verbal command 202 in analog form. The analog verbal command 202 may include, for example, "Print B." The printer 110 further includes an audio digitizer 206 configured to convert the analog verbal command 202 into a digital verbal command 208. The Audio digitizer 206 is configured to generate the digital verbal command 208 by using an analog-to-digital converter to receive an electrical signal representative of the analog verbal command 202 from the microphone 204 and to generate a digital file, such as a Windows Media Format File (".WMA") or an MPEG Layer III Audio File (".MP3"), for example, corresponding to the received electrical signal.

It is noted that FIGS. 2 and 3 refer to a number of "modules." As used herein, the term module refers to a combination of hardware, firmware, and/or software, such as including executable instructions executed by a processor, as shall be discussed in greater detail hereinafter in reference to FIG. 6. By way of illustrative example, the printer 110 further includes a communication interface module 210, which may comprise physical hardware, such as wired connections (e.g., electrically-conductive traces) and wireless connections (e.g., a wireless transceiver enabling transmission and reception of electromagnetic radiation), and may be enabled by the execution of instructions by a processor. Execution of the instructions by the processor may enable the communication interface module 210 to be configured to communicate the digital verbal command 208 to the navigation printing computing device 116. The communication interface module 210 is further configured to receive content from the navigation printing computing device 116 based on the digital verbal command 208.

The printer 110 further includes a print module 212 configured to receive the content from the communication interface module 210 and to generate printed content 214, such as the printed related document 112 of FIG. 1, for user consumption. The print module 212 may also refer to a combination of hardware, firmware, and/or software, similar to the discussion of the communication interface module 210. By way of non-limiting example, the print module 212 may comprise a print engine (not shown) capable of receiving print data and enable formation of markings on a print medium (e.g., application of ink to a print medium, such as using a thermal printhead or a piezoelectric printhead; application of a latent image in toner to a print medium, such as using an organic photoconductive drum; etc.).

In one example, the communication interface module 210 may receive from the navigation printing computing device 116 a digital verbal response, such as a .WMA or an .MP3 audio file, rather than content for printing. Thus, the printer further comprises a speaker 216 to receive the verbal response and to generate an audible message 218 for user consumption.

Figure 3:
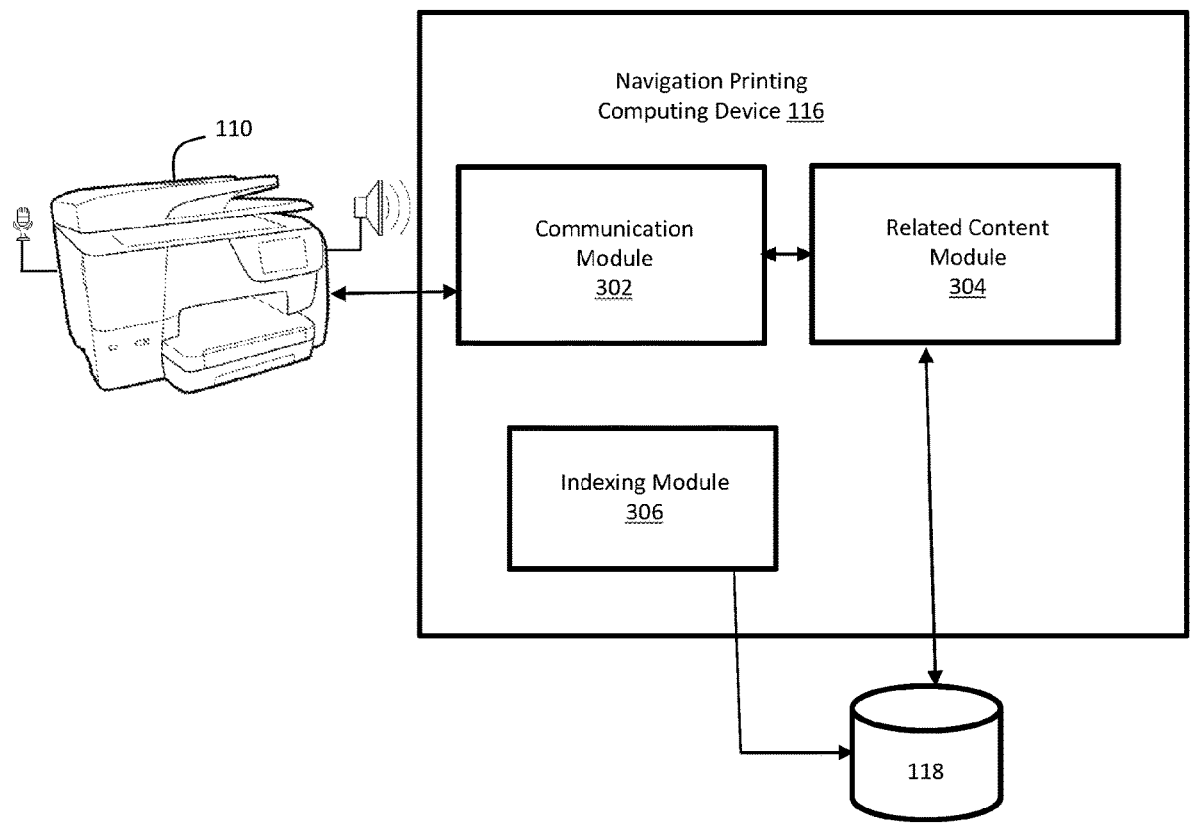
FIG. 3 illustrates a block diagram of an example navigation printing computing device of FIG. 1.

FIG. 3 is a block diagram of the example navigation printing computing device 116 of FIG. 1. The navigation printing computing device 116 includes a communication module 302, which may comprise physical hardware, such as wired connections (e.g., electrically-conductive traces) and wireless connections (e.g., a wireless transceiver enabling transmission and reception of electromagnetic radiation), and may be enabled by the execution of instructions by a processor. Execution of the instructions by the processor may enable the communication module 302 to be configured to communicate with the printer 110 and to receive the digital verbal command 208 of FIG. 2 from the printer 110. For example, the communication module 302 may be configured to receive a digital verbal command such as "print document A."

The communication module 302 is further configured to communicate with a related content module 304, which may comprise physical hardware, and may be enabled by the execution of instructions by a processor. Execution of the instructions by the processor may enable the navigation printing computing device 116 to identify and retrieve data from the content database 118 of FIG. 1. In particular, the content database 118 is configured to store document associations or content in association with voice commands or tags. The content database 118 may include a lookup table or an index, for example, that associates tags with related content. In one example, the content database 118 stores the tag as well as the association with related content, but not the actual content. For example, the content database 118 may be configured to store a link to the content or other information pertaining to instructions for retrieving the related content for a third party.

The related content module 304 is configured to search the content database 118 for related content associated with the received digital verbal command. In particular, the related content module 304 may search a lookup table or an index stored by the content database 118 in order to identify any entries corresponding to the received digital verbal command. The related content module 304 is further configured to retrieve identified related content associated with the received digital verbal command, either directly from the content database 118 or from a third-party database.

The related content module 304 is further configured to communicate, via the communication module 302, the retrieved related content to the printer 110 for printing. The retrieved related content may include a word document or a PDF document, for example. It should be appreciated that related content may include additional tags or voice commands embedded in the document. Further, the document may be split into multiple sections, each of which may include a separate tag.

In one example, rather identifying in the content database 118 related content that corresponds to a received digital verbal command, the related content module 304 may be configured to identify a voice node or a decision point requiring further input from a user. For example, a received voice command "print news" may be associated with a selection voice command or node which calls for selection of one of two news sources. The selection voice node may request a user to "select news A or news B,' for example. Thus, the related content module 304 may be configured to retrieve a voice node in response to receiving a voice command and to communicate the voice node, via the communication module 302, to the printer 110.

The navigation printing computing device 116 further includes an indexing module 306, which may comprise physical hardware, and may be enabled by the execution of instructions by a processor. Execution of the instructions by the processor may enable the indexing module 306 to be configured to enable indexing of related content in the content database 118. In particular, the indexing module 306 is configured to enable identifying content for indexing, to generate a unique voice command corresponding to the particular identified content, and to associate the content with the unique voice command. In one example, the indexing module 306 may be configured to generate voice commands unique for a specific hierarchy. For example, a first hierarchy for news content may include a voice command "print document A" associated with printing specific news content while a second hierarchy for game content may include the same voice command "print document A" associate with printing a specific game. Thus, depending on a hierarchy being currently engaged, a different document may be printed in response to the same received digital verbal command.

In another example, the indexing module 306 may be configured to generate voice commands that are unique across all hierarchies. For example, a voice command "print document A" may always be associated with a specific document, regardless of the hierarchy currently engaged. In one example, the voice command may include 2 components, one being indicative of the hierarchy currently engaged and one being indicative of the content to be printed. For example, a voice command "print news document A" may indicate a desire to engage the news hierarchy and to specifically print document "A" associated with the news hierarchy. In another example, a current hierarchy being engaged may be identified via an initial voice command or other suitable means and subsequently received voice commands within a given session or time period may be automatically associated with the same currently engaged hierarchy.

In one example, the indexing module 306 may be configured to define a voice command arbitrarily without relevance to specific content. For example, the indexing module 306 may be configured to combine and assign a unique succession of predefined words. In one example, the indexing module 306 may be configured to assign four words, chosen from 26 different words associated with respective letters of the alphabet from Alpha to Zebra, thus creating 26×26×26×26=456,976 possible combinations of voice commands. In one example, to avoid confusion and overlap between different hierarchies, an additional unique hierarchy-specific word may be added to the succession of words. In one example, the indexing module 306 is configured to enable a user to define a voice command as well as to associate the voice command with related content.

The indexing module 306 is further configured to enable splitting content or a document into sections and associating the sections with unique voice commands. The unique voice commands may thus enable printing of additional content related to specific sections of a document.

Figure 4:
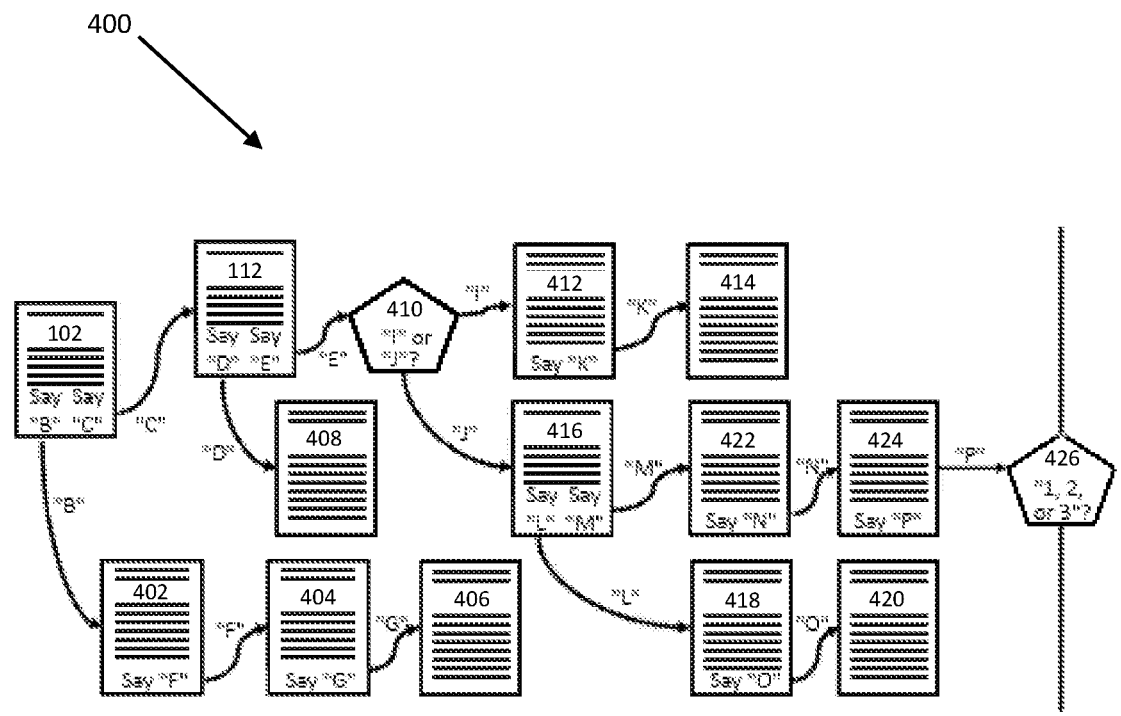
FIG. 4 illustrates an example hierarchy of printable content.

The example navigation printing system 100 described will be further understood and appreciated with reference to an example hierarchy 400 of printable content illustrated in FIG. 4. As previously described in FIG. 1, the tagged document 102 includes the tags "Say B," and as "Say C." Upon receiving a voice command "B," the printer 110 responds by printing the related document 402, which includes an additional tag "Say F." Upon receiving a voice command "F," the printer 110 responds by printing the related document 404, which includes an additional tag "Say G." Upon receiving a voice command "G," the printer 110 responds by printing the related document 406," which in this example does not include any further tags.

Alternatively, if a voice command "C" is received, rather than voice command "B," the printer 110 responds by printing the related document 112, as described in FIG. 1, which includes additional tags "Say D" and "Say E." Upon receiving a voice command "D," the printer 110 responds by printing the related document 408, which in this example does not include any further tags.

Alternatively, upon receiving a voice command "E," the printer 110 responds by communicating node 410 or a choice. In particular, the node 410 enables selection of "I" or "J." Upon receiving a voice command "I," the printer 110 responds by printing the related document 412, which includes an additional tag "Say K." Upon receiving a voice command "K," the printer 110 responds by printing the related document 414," which in this example does not include any further tags.

Alternatively, if a voice command "J" is received, rather than voice command "I," the printer 110 responds by printing the related document 416, which includes additional tags "Say L" and "Say M." Upon receiving a voice command "L," the printer 110 responds by printing the related document 418, which includes an additional tag "Say 0." Upon receiving a voice command "0," the printer 110 responds by printing the related document 420," which in this example does not include any further tags.

Alternatively, if a voice command "M" is received, rather than voice command "L," the printer 110 responds by printing the related document 422, which includes additional tag "Say N." Upon receiving a voice command "N," the printer 110 responds by printing the related document 424, which includes an additional tag "Say P." Upon receiving a voice command "P," the printer 110 responds by communicating node 426, enabling selection of "1," "2," or "3."

It should be appreciated that the illustrated hierarchy 400 is one example hierarchy and that a hierarchy may include any combination of documents and nodes. Moreover, the included documents in a hierarchy may include any number of tags.

It should be appreciated that the example navigation printing system 100, with specific reference to the example hierarchy 400 of printable content, has been described with the assumption that the tagged document 102 has already been printed, thereby providing an entry into a content hierarchy. In one example, the navigation printing system 100, and in particular the printer 110, is configured to be primed in order to provide an entry into a content hierarchy. For example, the printer 110 may include a button (not shown) for initiating navigation printing. In particular, the printer 110 may be configured to print the tagged document 102 upon receiving an indication of the button being pressed. In one example, the printer 110 may be configured to print a list of multiple available document hierarchies when the button is pressed. For example, a list may include tags or voice commands for entering hierarchies for news, games, books, and so on. The navigation printing system 100 may then be configured to operate as previously described, upon receiving an initial voice command after printing the initial list or tagged document 102. In another example, instead of (or in addition to) the button, the printer 110 may be configured to always be listening for a voice command. Thus, navigation printing may be initiated by a voice command at any time. In another example, the printer 110 may include a motion sensor (not shown) wherein the printer 110 remains in a sleep mode and wakes up to listen for voice commands upon detecting a motion near the printer 110.

Figure 5:
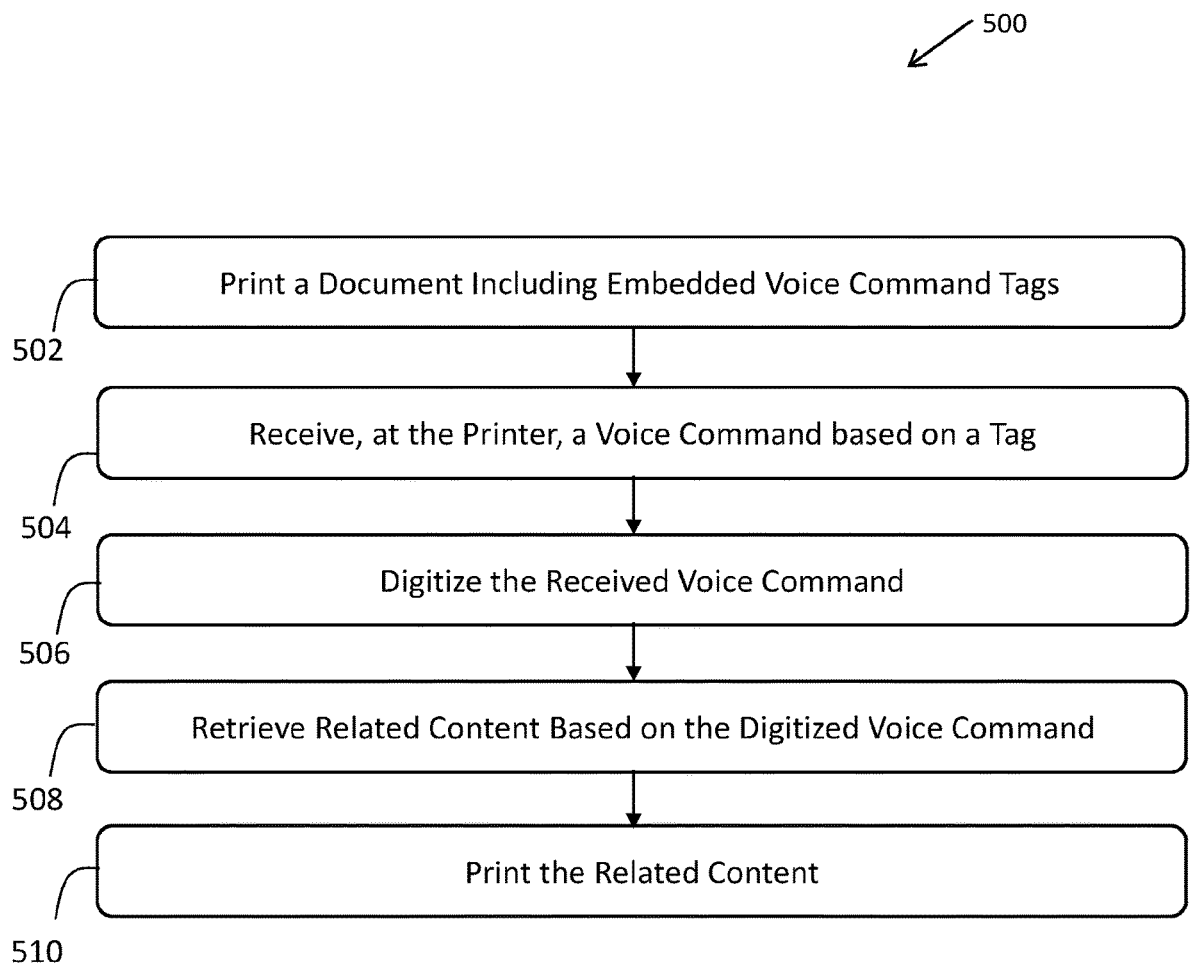
FIG. 5 illustrates an example method for navigation printing with a content hierarchy via voice tagging.

FIG. 5 is a flow chart illustrating an example method 500 for navigation printing with a content hierarchy via voice tagging. At block 502, printer prints a document including embedded voice command tags. At block 504, the printer receives a voice command based on one of the embedded voice command tags of the document. At block 506, the printer digitizes the received voice command. At block 508, related content is retrieved based on the digitized voice command. At block 510, the printer prints the related content.

Figure 6:
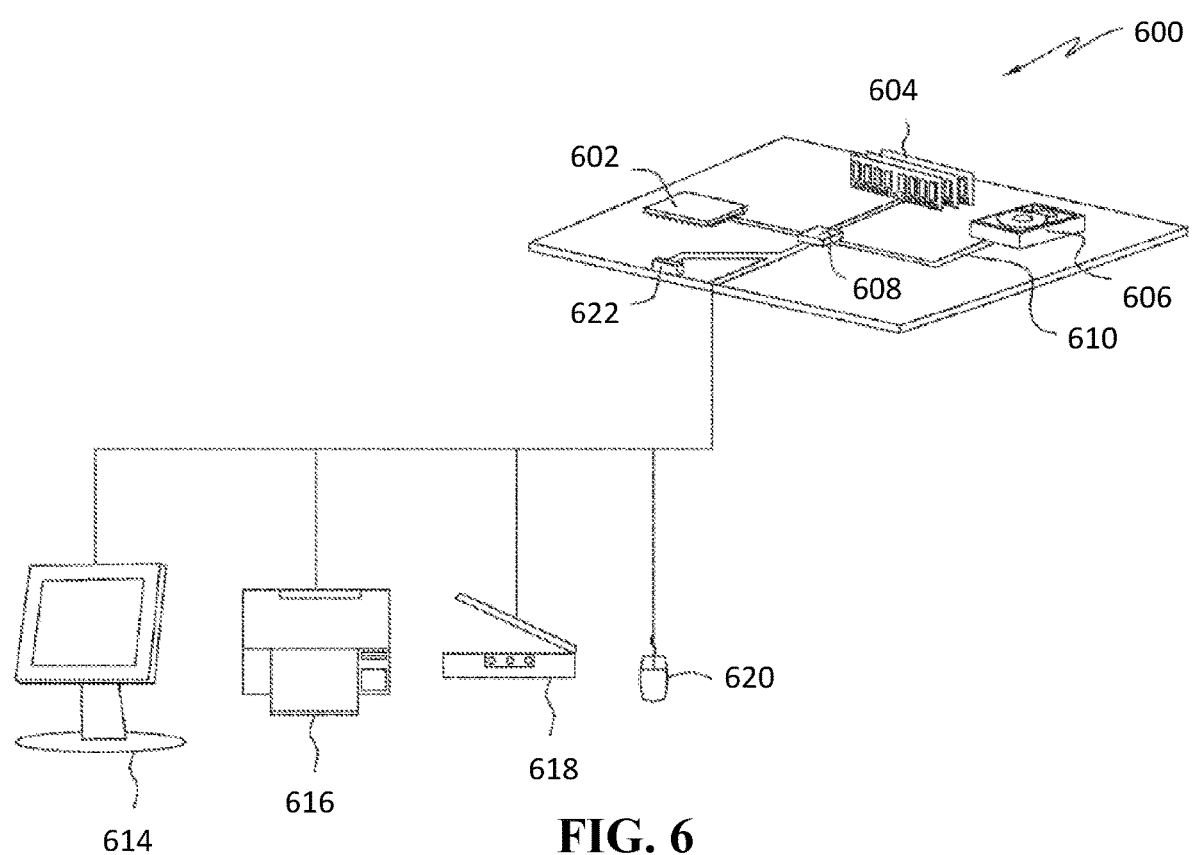
FIG. 6 illustrates a block diagram of an example computer for implementing the example navigation printing computing device of FIG. 1.

FIG. 6 is a schematic diagram of an example computer 600 for implementing the example navigation printing computing device 116 of FIG. 1. The example computer 600 is intended to represent various forms of digital computers, including laptops, desktops, handheld computers, tablet computers, smartphones, servers, and other similar types of computing devices. It is noted that many print devices, such as printer 110, may comprise components described in relation to FIG. 6, including, for example, a processor, memory, a storage device, and a communication port, without limitation. Computer 600 includes a processor 602, memory 604, a storage device 606, and a communication port 608, operably connected by an interface 610 via a bus 612.

Processor 602 processes instructions, via memory 604, for execution within computer 600. In an example aspect, multiple processors along with multiple memories may be used.

Memory 604 may be volatile memory or non-volatile memory. Memory 604 may be a computer-readable medium, such as a magnetic disk or optical disk. Storage device 606 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 604 or storage device 606.

In one example, such as discussed above in relation to FIGS. 2 and 3, the processor 602, the memory 604, the storage device 606, and the communication port 608 may operate in combination to enable the different modules, such as the communication interface module 210, the print module 212, the communication module 302, the related content module 304, and the indexing module 306.

Computer 600 can be coupled to input and output devices such as a display 614, a printer 616, a scanner 618, and a mouse 620.

As will be appreciated by one of skill in the art, the example aspects may be actualized as, or may generally utilize, a method, system, computer program product, or a combination of the foregoing. Accordingly, any of the aspects may take the form of specialized software comprising executable instructions stored in a storage device for execution on computer hardware, where the software can be stored on a computer-usable storage medium having computer-usable program code embodied in the medium.

Databases, such as the content database 118, may be implemented using commercially available computer applications, such as open source solutions such as MySQL, or closed solutions like Microsoft SQL that may operate on the disclosed servers or on additional computer servers. Databases may utilize relational or object oriented paradigms for storing data, models, and model parameters that are used for the example aspects disclosed above. Such databases may be customized using known database programming techniques for specialized applicability as disclosed herein.

Any suitable computer usable (computer readable) medium may be utilized for storing the software comprising the machine readable and executable instructions. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having wires; a tangible medium such as a portable computer diskette, a hard disk, a random access memory (RAM), a read-only memory (ROM), an erasable programmable read-only memory (EPROM or Flash memory), a compact disc read-only memory (CDROM), or other tangible optical or magnetic storage device; or transmission media such as those supporting the Internet or an intranet.

In the context of this document, a computer usable or computer readable medium may be any medium that can contain, store, communicate, propagate, or transport the program instructions for use by, or in connection with, the instruction execution system, platform, apparatus, or device, which can include any suitable computer (or computer system) including programmable or dedicated processor/ controller(s). The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, local communication busses, radio frequency (RF) or other means.

Computer program code having executable instructions for carrying out operations of the example aspects may be written by conventional means using any computer language, including but not limited to, an interpreted or event driven language such as BASIC, Lisp, VBA, or VBScript, or a GUI aspect such as visual basic, a compiled programming language such as FORTRAN, COBOL, or Pascal, an object oriented, scripted or unscripted programming language such as Java, JavaScript, Perl, Smalltalk, C++, Object Pascal, or the like, artificial intelligence languages such as Prolog, a real-time embedded language such as Ada, or even more direct or simplified programming using ladder logic, an Assembler language, or directly programming using an appropriate machine language.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What have been described above are examples. It is, of course, not possible to describe every conceivable combination of components or methods, but one of ordinary skill in the art will recognize that many further combinations and permutations are possible. Accordingly, the claims are intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method comprising:
    receiving, via a microphone at a printer, a voice command based on a tag among a plurality of tags of an indexed document, wherein the plurality of tags are associated with a plurality of sections of the indexed document;
    digitizing the voice command;
    retrieving a supplemental document associated with the tag based on the digitized voice command; and
    printing the supplemental document at the printer.

2. The method of claim 1, wherein retrieving the supplemental document comprises retrieving a plurality of supplemental documents, and wherein the method further comprises:
    communicating, via a speaker, an audible message representative of an instruction to select one of the plurality of supplemental documents; and
    receiving, via the microphone, an audible input comprising a selection voice command representative of an instruction to print a selected one of the plurality of supplemental documents.

3. The method of claim 1, further comprising initiating navigation printing by printing the indexed document responsive to receiving an initiating input, the initiating input comprising one of an audible voice command or an indication of a button on the printer being pressed, and the plurality of tags including printed tags associated with different supplement documents including the supplemented document.

4. The method of claim 1, wherein retrieving the supplemental document based on the digitized voice command comprises identifying the supplemental document by searching a database for a document association corresponding to the digitized voice command.

5. The method of claim 4, further comprising receiving at least one of a user-defined voice command and a user-defined document association and storing the at least one of the user-defined voice command and the user-defined document association in the database.

6. The method of claim 1, further comprising generating the tag of the indexed document by combining a unique succession of predefined words.

7. The method of claim 1, further comprising generating the indexed document by splitting a document into the plurality of sections and associating a corresponding voice command with each of the plurality of sections.

8. The method of claim 1, further comprising receiving at least one of a user-defined voice command and a user-defined document association and storing the at least one of the user-defined voice command and the user-defined document association in a database that stores the plurality of tags and document associations between a plurality of voice commands, including the voice command, and a plurality of documents including the plurality of supplemental documents.

9. A printer device comprising:
    a microphone;
    an audio digitizer;
    a non-transitory computer-readable storage medium storing instructions; and
    a processing unit configured to access the non-transitory computer-readable storage medium and execute the instructions to perform operations, the operations comprising:
        receiving, via the microphone, an audible input comprising a voice command based on a tag among a plurality of tags of an indexed document, wherein the plurality of tags are associated with a plurality of sections of the indexed document and associated with a plurality of supplemental documents;
        digitizing, via the audio digitizer, the voice command;
        retrieving a supplemental document among the plurality of supplemental documents that is associated with the tag based on the digitized voice command; and
        printing the supplemental document.

10. The printer device of claim 9, further comprising a speaker, wherein retrieving the supplemental document comprises retrieving the plurality of supplemental documents, and wherein the operations further comprise:

communicating, via the speaker, an audible message representative of an instruction to select one of the plurality of supplemental documents; and receiving, via the microphone, an audible input comprising a selection voice command representative of an instruction to print a selected one of the plurality of supplemental documents.

11. The printer device of claim 9, further comprising an initiating button, wherein the operations further comprise:

receiving an indication of the initiating button being pressed; and printing the indexed document.

12. The printer device of claim 9, wherein retrieving the supplemental document based on the digitized voice command comprises:

identifying the supplemental document by communicating with a database comprising a plurality of document associations between a plurality of voice commands and a plurality of documents; and searching for a document association corresponding to the digitized voice command.

13. The printer device of claim 12, the operations further comprising receiving at least one of a user-defined voice command and a user-defined document association and storing the at least one of the user-defined voice command and the user-defined document association in the database.

14. The printer device of claim 9, the operations further comprising generating the tag of the indexed document by combining a unique succession of predefined words, wherein the tag is arbitrarily generated.

15. The printer device of claim 9, the operations further comprising generating the indexed document by splitting the indexed document into the plurality of sections and associating a voice command with each of the plurality of sections, thereby enabling printing of content related to the respective plurality of sections.

16. The printer device of claim 9, wherein the operations further comprise:

receiving, via the microphone, a second audible input comprising a second voice command based on a tag among a plurality of tags of the supplemental document, wherein the plurality of tags are associated with a plurality of sections of the supplemental document and associated with related content for printing;

digitizing, via the audio digitizer, the second voice command;

retrieving a further supplemental document associated with the related content based on the digitized second voice command; and printing the further supplemental document.

17. The printer device of claim 9, wherein the plurality of tags are associated with the plurality of sections of the indexed document are each positioned within a respective one of the plurality of sections.

18. A non-transitory computer readable medium storing machine readable instructions, the machine readable instructions comprising:

generating an indexed document by splitting a document into a plurality of sections and associating a corresponding voice command of a plurality of voice commands with each of the plurality of sections;

receiving an instruction to initiate navigation printing using voice commands, the instruction comprising one of an audible voice command and an indication of a button pressed;

communicating to a printer an instruction to print the indexed document comprising the plurality of sections, each section associated with a tag representative of one of a plurality of voice commands;

receiving, via a microphone at a printer, an audible input comprising one of the plurality of voice commands;

digitizing the voice command;

retrieving a supplemental document based on the digitized voice command; and communicating to the printer an instruction to print the supplemental document.

19. The non-transitory computer readable medium of claim 18, wherein the plurality of tags indicate the plurality of voice commands, the plurality of voice commands being associated with a plurality of supplemental documents including the supplemental document.

20. The non-transitory computer readable medium of claim 18, wherein the supplemental document includes additional tags positioned within a plurality of sections of the supplemental document.

* * * * *